July 28, 1931.  F. R. KLAUS ET AL  1,816,380
DUAL WHEEL
Filed June 21, 1928    2 Sheets-Sheet 1
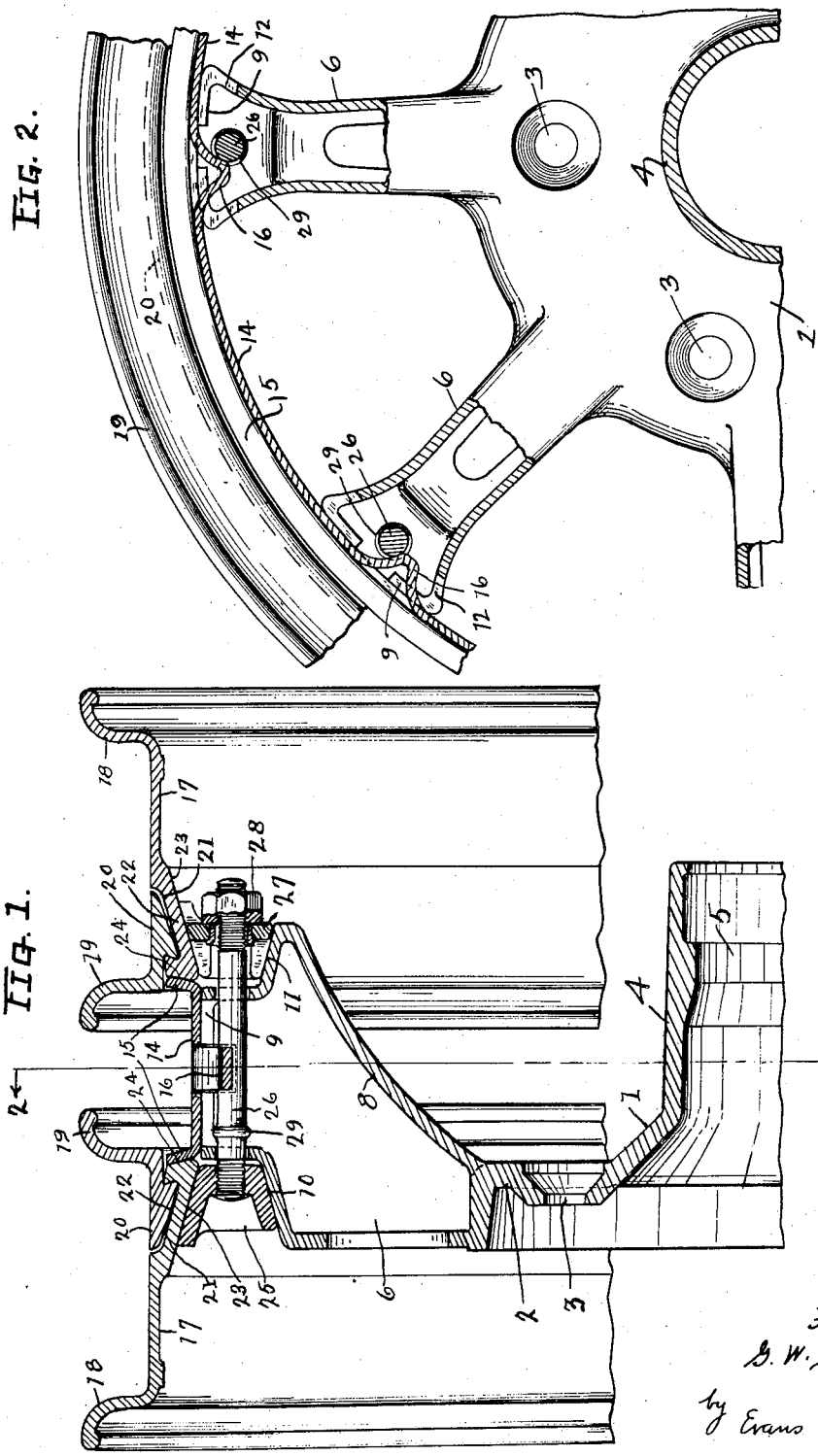
INVENTORS
F. R. Klaus
G. W. Seiberling
by Evans & McCoy
ATTORNEYS

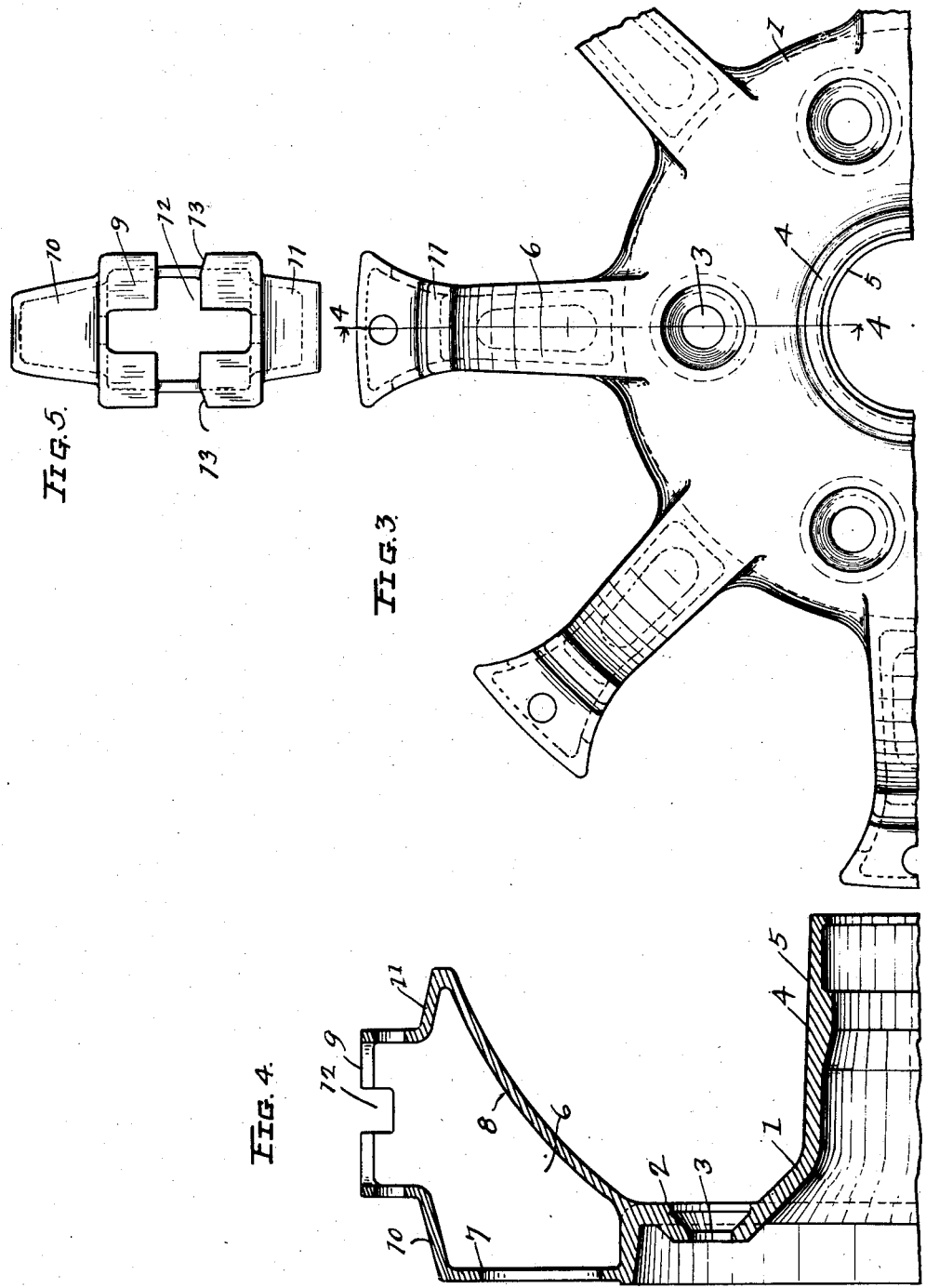

Patented July 28, 1931

1,816,380

UNITED STATES PATENT OFFICE

FRED R. KLAUS, OF WARREN, AND GEORGE W. SEIBERLING, OF AKRON, OHIO, ASSIGNORS, BY DIRECT AND MESNE ASSIGNMENTS, TO THE AMERICAN WELDING & MANUFACTURING COMPANY, OF WARREN, OHIO, A CORPORATION OF OHIO

DUAL WHEEL

Application filed June 21, 1928. Serial No. 287,271.

This invention relates to dual wheels for motor vehicles and more particularly to the mounting of a pair of tire carrying rims side by side upon the periphery of the wheel body.

One object of the invention is to provide a mounting for a pair of tire carrying rims on a wheel body in which the rims are held in place by clamping means acting on both rims and exerting clamping pressure equally on the two rims.

A further object is to provide a mounting by which both rims are rigidly secured and maintained in true running alinement with respect to the wheel body.

A further object is to provide a mounting which permits removal of both rims from the wheel body without removal of the wheel from the axle in which both rims are held in place by movable wedge members pressed toward the center plane of the wheel.

A further object is to provide a mounting which includes a fixed central supporting band, which is rigidly held in true running alinement with respect to the wheel body and against lateral movements on the wheel body, together with means for clamping the rims against the fixed central supporting band.

A further object is to provide means for securing the supporting band on the wheel body which rigidly holds the supporting band against lateral movements, but which permits removal of the supporting band so that the inner rim may be mounted or demounted over the periphery of the wheel body.

With the above and other objects in view, the invention may be said to comprise the dual wheel as illustrated in the accompanying drawings hereinafter described and particularly set forth in the appended claims, together with such variations and modifications thereof as will be apparent to one skilled in the art to which the invention appertains.

Figure 1 is a fragmentary radial section through the dual wheel, showing the mounting of the tire carrying rims.

Fig. 2 is a section taken on the line indicated at 2—2 in Fig. 1.

Fig. 3 is a fragmentary side elevation of the wheel body.

Fig. 4 is a radial section taken on the line indicated at 4—4 in Fig. 3.

Fig. 5 is an end view of one of the spokes of the wheel body.

While it is to be understood that the present invention is applicable to various types of wheel bodies, the wheel body herein illustrated is a one-piece casting in the form of a spider. The wheel body has a hub 1, which is provided with a substantially flat attaching portion 2, provided with countersunk bolt openings 3 to receive the bolts for attaching the wheel body and hub flange. The hub also has a laterally projecting tubular axle receiving portion 4, which is provided with an internal bearing shoulder 5, which provides a support on the axle spaced outwardly from the attaching flange to which the hub is secured. The hollow spokes 6 radiate from the hub 1 and these spokes have substantially vertical walls 7 at the inner side of the wheel and laterally inclined walls 8 on the outer side, which overhang the tubular portion 4 of the hub. The outer ends of the spokes have seating surfaces 9 machined to conform to a cylindrical surface coaxial with the hub.

The central plane of the seating portions 9 at the outer ends of the spokes is substantially midway between the attaching portion 2 and the bearing shoulder 5, so that the load which is imposed upon the seating portions 9, is substantially centered between the attaching flange and bearing of the hub. The spokes 6 are formed to provide on the inner and outer sides thereof inclined shoulders 10 and 11, which are spaced inwardly from the bearing portions 9 and extend laterally from the central bearing portions. The bearing portions 9 at the outer ends of the spokes are provided with circumferential slots 12, which extend across the spoke ends for a purpose which will be hereinafter explained, one edge of the slot being provided at each end with a bevel 13 to widen the ends of the slot to facilitate the entry of a lug into the slot.

An endless supporting band 14 is mounted upon the end bearing surfaces 9 of the spoke 6, the band 14 having a cylindrical inner surface of a diameter to fit upon the spoke ends. The supporting band is preferably of channel form in cross section, being provided with outwardly projecting flanges 15 along its opposite side edges. The supporting band is also provided with internal lugs 16 which are struck up from the body thereof and which are of a width to fit snugly in the slots 12 of the spoke ends. The lugs 16 are spaced circumferentially of the supporting band to correspond to the angular spacing of the spokes so that when the band is in position on the spokes, the lugs engaging the spokes are all in the same relative position with respect thereto.

In assembling the supporting band on the wheel body, the band is slid laterally onto peripheral seats 9 with the lugs 16 positioned between the spokes. The band is then moved circumferentially to cause the lugs 16 to move into the slots 12 in the ends of the spokes, the lugs being guided by the beveled edges 13 at the ends of the slots. When the lugs 16 are centered with respect to the spokes, they are in snug engagement with the opposite edges of the slots 12 so that the supporting band is positioned in true running alinement with the wheel body and is rigidly held against lateral movement on the wheel body.

Two tire carrying rims 17, which may be of identical construction are mounted upon the wheel body and each of these rims has along one edge an integral outwardly projecting tire retaining flange 18 and along its opposite edge, a detachable flange ring 19, which has a base 20 interlocked with the base of the rim, the base 20 being seated in a circumferential groove 21 formed in an inwardly tapering side portion 22 of the rim, the tapering portion 22 providing a conical seating face 23 upon the interior of the rim. The inclined edge portions 22 of the rims terminate beneath the flange ring 19 and provide shoulders 24 adapted to fit against the side flanges 15 of the supporting band. The two rims are oppositely arranged on the wheel body with their shoulders 24 engaging the opposite edge flanges 15 of the supporting band and means is provided for clamping the rims to the wheel body in such a manner as to exert a radial outward pressure on the rims and to press the same laterally against the supporting band, the clamping pressure being exerted by means of wedge members interposed between the shoulders 10 and 11 on the spokes and the conical seating faces 23 of the rims.

A wedge lug 25 fits between the inclined shoulder 10 at the inner side of each spoke and the conical seating face 23 of the inner rim and each wedge lug has rigidly attached thereto a bolt 26 which extends transversely through the spoke outwardly of the shoulders 10 and 11 and inwardly of the end seating portions 9 of the spoke. On the outer side of the wheel, a wedge lug 27 fits between the inclined shoulder 11 and the conical seating face 23 of the outer rim and this lug has an aperture to receive the bolt 26.

Rotatably mounted in the lug 27, there is a nut 28, which has threaded engagement with the bolt 26 for drawing the wedge lugs simultaneously toward the center plane of the wheel to clamp the rims in place. Tightening of the nut 28 causes the wedge lugs 25 and 27 to be simultaneously moved toward each other, drawing the bolt 26 and lug 25 outwardly and forcing the lug 27 inwardly, substantially equal pressures being applied to the opposed wedge lugs so that the two rims are held with substantially equal pressure against the flanges 15 of the supporting band.

The bolts 26 are preferably permanently mounted, being held in place by means of the inner wedges 25 and shoulders 29 formed on the bolts which are engageable with the interior of the inner walls of the spoke ends, the shoulders 29 being spaced sufficiently from the wedges 25 to permit the necessary endwise play of the bolts to tighten and loosen the wedges. The wedges 27 are removable with the nuts 28 to permit the outer of the rims to be demounted and the inner rim may be demounted by removing the supporting band 14.

It should be noted that in the rim mounting of the present invention, the loads are transmitted to the wheel body through the wedges without subjecting the bolts to bending or shearing stresses, the wedges providing rigid supports between the rims and wheel body.

It should also be noted that the rigidly secured central supporting band enables a single rim to be secured in place on the wheel body so that if one of the rims should be damaged, a single rim and tire can be used on a wheel to enable the vehicle to be run to a convenient place for repair.

By clamping the two rims in engagement throughout their periphery with a supporting band, which is rigidly held in true running alinement with respect to the wheel body, a true running alinement of the inner and outer tires is insured. By providing a common clamping means for the two rims, the structure is materially simplified and equal pressure is exerted on the two tire carrying rims.

It will be apparent that the present invention provides a dual wheel construction in which true alinement of the rims and tires with respect to the wheel body is obtained. Furthermore, the mounting and demounting of the two tire carrying rims is greatly simplified by providing a single set of clamping bolts and wedge lugs for holding the rims in place.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What we claim is:

1. In a dual wheel, the combination with a wheel body having circumferential slots in its periphery of a supporting band fitting on the peripheral portion of the wheel body and having lugs engaging in said slots and having a close fit therein to rigidly hold the band against lateral movements with respect to the wheel body, and means carried by the wheel body for clamping a pair of rims, one against each side of said band, said clamping means including members extending across the peripheral portion inwardly of the slots with which said lugs of the supporting band engage to position the band on the wheel body and limit circumferential movement of the band on the wheel body.

2. In a dual wheel, the combination of a wheel body having circumferential slots in its periphery and outwardly inclined seats on opposite sides thereof spaced inwardly from the slotted peripheral portion, of a supporting band having lugs engaging in said slots and having a close fit therein to rigidly hold the band against lateral movement with respect to the wheel body, wedge members slidably mounted on the inclined seats of the wheel body and having inclined outer faces for clamping tire carrying rims to said supporting band and clamping bolts passing through the wheel body and connecting said wedging members for simultaneously drawing the same toward the center plane of the wheel, said lugs being engageable with said bolts to position the supporting band on the wheel body and limit circumferential movement of the band on the wheel body.

3. In a dual wheel, the combination with a wheel body in the form of a spider having a hub and spokes extending radially therefrom, said spokes having slots in the outer ends thereof extending circumferentially of the wheel, of an endless spacer band seated on the ends of said spokes and having internal lugs fitting in said slots, said lugs being movable into and out of said slots by circumferential movements of the band on the wheel body and clamping means carried by the spokes and adapted to clamp a pair of rims, one against each side of said band.

4. In a dual wheel, the combination with a wheel body in the form of a spider having a hub and spokes extending radially therefrom, said spokes having slots in the outer ends thereof extending circumferentially of the wheel, and laterally extending shoulders on the inner and outer sides thereof spaced radially inwardly from their outer ends, of an endless spacer band seated on the outer ends of the spokes and having internal lugs fitting in said slots, said lugs being movable into and out of said slots by circumferential movements of the band, wedge members slidably mounted on said shoulders adapted to clamp a pair of rims against said band, one on each side of the band, and clamping bolts extending through the spokes for simultaneously drawing said wedge members inwardly toward the center plane of the wheel.

5. In a dual vehicle wheel of the class described, a wheel member having a plurality of outwardly radiating spokes, a unitary annular positioning member extending around said spokes, said spokes having at their outer ends circumferential slots, said positioning member having at its inner side inwardly directed lugs extending into said circumferential slots, a pair of tire rims positioned against the opposite sides of the positioning member and in opposed relation to each other, wedge means positioned at the inner and outer sides of each spoke in engagement with the tire rims, and bolts in each spoke securing the wedge means at the opposite sides of each spoke to the wheel member and to the tire rims, said bolts serving as stop means for the relative rotation of the positioning member to the wheel member when the inwardly directed lugs of the positioning member are positioned thereagainst in the circumferential slots at the outer ends of the spokes.

In testimony whereof we affix our signatures.

FRED R. KLAUS.
GEORGE W. SEIBERLING.